No. 650,989. Patented June 5, 1900.
J. P. RANOE.
STOP AND THROUGHWAY VALVE.
(Application filed Nov. 17, 1899.)
(No Model.)
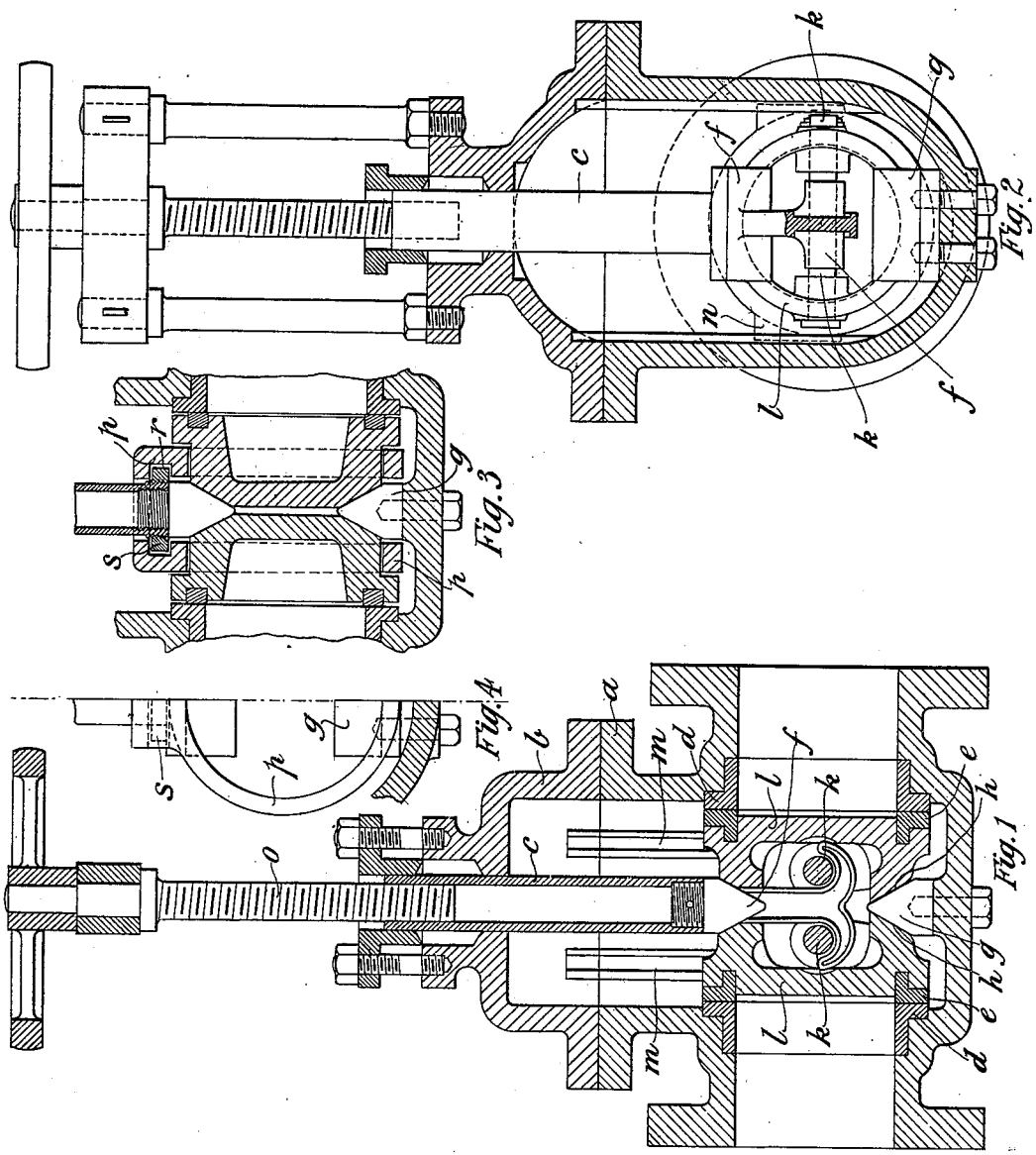

UNITED STATES PATENT OFFICE.

JAMES PHILIP RANOE, OF RUGBY, ENGLAND.

STOP AND THROUGHWAY VALVE.

SPECIFICATION forming part of Letters Patent No. 650,989, dated June 5, 1900.

Application filed November 17, 1899. Serial No. 737,367. (No model.)

*To all whom it may concern:*

Be it known that I, JAMES PHILIP RANOE, a subject of the Queen of Great Britain and Ireland, residing at Vicarage road, Rugby, in the county of Warwick, England, have invented certain new and useful Improvements in Stop and Throughway Valves, (for which I have made an application for Letters Patent in Great Britain, No. 8,784, dated April 26, 1899,) of which the following is a specification.

This invention relates to improvements in connection with stop and throughway valves for steam, water, gas, and for like purposes, the object being to produce a simple, easily-repaired, and efficient throughway clear passage, stop, or shut-off valve in which there shall be double wedging or closing surfaces by the action of the screw-down spindle or lever for controlling such valve.

The invention is illustrated in the accompanying drawings, in which—

Figure 1 is a longitudinal vertical section; Fig. 2, a section at right angles to Fig. 1, and Figs. 3 and 4 detail sectional views.

In carrying my invention into effect when constructing a stop-valve for use in shutting off steam or water and for manipulation by means of the ordinary hand-wheel and spindle I form the body of the valve as a T-piece, the flanges on the throughway passage being made at either end to suit the form of flange or coupling connection to which the valve is to be attached. On the upper portion of the valve-body I form a flange $a$ and secure onto it a casing $b$, upon which I form a stuffing-box for the spindle $c$ to pass through, the stuffing-box being provided with gland-tightening screws or attachments constructed in any ordinary manner.

I provide within the opening of the valve-body bushes or rings $d$, of gun-metal or other suitable material, which shall form a working face against which the valve-disks $e$ can be made to seat. The valve-disks $e$ I make in pairs coupled together by means of a carrier $f$, cradle-casting, or frame, into which the bodies of the valve-disks can enter, so that when the carrier or cradle is raised or lowered the two valve-disks are raised and lowered also.

Upon the lower portion of the valve body or chamber into which the valve-disks enter I provide a double wedge-like ridge-piece $g$ of circular, segmental, or square configuration to suit and receive the similarly-formed conical faces $h$ on the inner portions of the valve-disks, the cone-surfaces being so arranged that when the valve-disks are thrust downward they slide one upon the other and so cause the disks $e$ to be forced outward and to wedge against the bearing-face $d$ of the bushes within the valve-passages.

Upon the end of the spindle-sleeve $c$ I screw or secure the end of a wedge-shaped carrier $f$, the lower portion of the carrier being formed as a double arm to enter under pins or lugs $k$, which are attached to or formed upon the inner sides of each valve-disk block $l$. To guide the disk-block, I prefer to form grooves $m$ or projecting ribs on the valve-body, into which ribs $n$ or channels on the valve-blocks may engage the guiding-ribs, fitting loosely into the grooves to admit of the lateral movement of the faces when forced apart by the downward motion of the spindle, which urges the tapered end of the carrier $f$ to enter between the tapered surfaces of the valve-blocks, while the tapered ridge-piece $g$ forces outward the lower portions of the blocks against the valve-seats $d$.

I sometimes make a cradle $p$ to carry the two valve-disks, and I place within it the end of the spindle having a T-shaped head, preferably upon it or attached to it, the inner portion of which is conical on both sides to suit the shape of the coned face on each of the valve-disks, so that when the screw-spindle is driven down the conical end of the spindle forces apart the valve-faces at the upper end, while the conical bridge-piece of the cradle or fixed seat in the center of the valve-chamber at the lower end also forces outward the valve-disks.

I introduce a gap or opening $r$ in the bridge-piece of the cradle-connecting neck or shoulder for receiving the spindle and a nut $s$ for causing it to raise and depress the cradle and its valve-face. To assist the action of the screw-spindle and to take off the weight of the valve, I may sometimes introduce a spring between the collar, which I form upon or attach to the spindle and cause the spring to press against the lower surface of the bridge-piece neck.

I make the central chamber of the valve of a capacity and size to admit of the whole of the valve-disks and connections to be easily withdrawn when the upper stuffing-box cover is removed.

I modify the form of my faces and the method of securing them in the cradle, together with the shape and connections of the spindle and its wedging end, to suit the type of the valve which is to be constructed and the purposes for which it is required.

I may actuate my spindle $o$ by means of a hand-wheel and screw and nut instead of a screwed sleeve, as $c$, for controlling its movement or by lever or rack and pinion, as employed for similar type of valves at present constructed in the ordinary manner.

Having thus described my invention, what I claim as new, and desire to secure by Letters Patent, is—

In a valve, in combination with the outer casing, having the wedge-block $g$, of independent valve-disks, a cradle carrying said disks, said cradle including rings having the disks fitted and slidable within the same, a valve-stem secured in the cradle and a wedge-shaped portion carried by the stem extending between said disks.

In witness whereof I have hereunto set my hand in presence of two witnesses.

JAMES PHILIP RANOE.

Witnesses:
F. A. HULLOCH,
H. F. WARREN NICHOLLS.